No. 848,080. PATENTED MAR. 26, 1907.
J. G. WENNINGER.
NUT LOCK.
APPLICATION FILED OCT. 5, 1906.
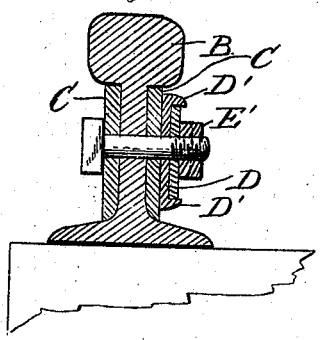
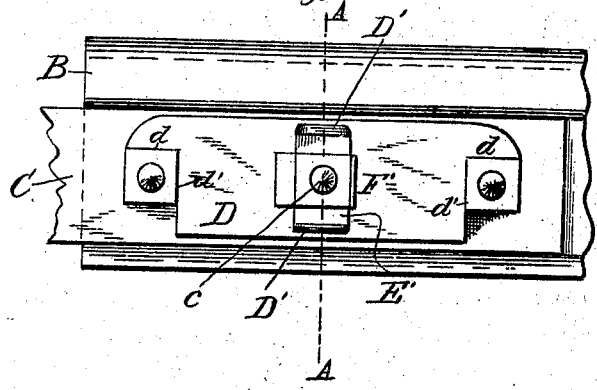
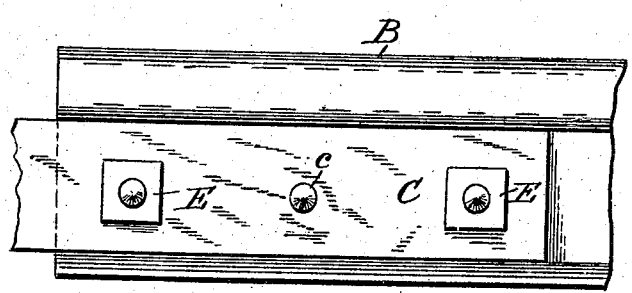
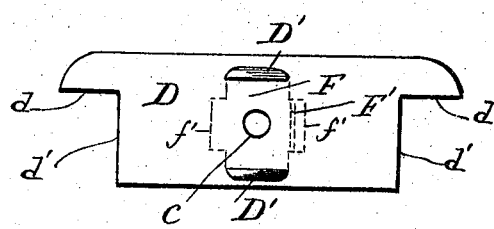
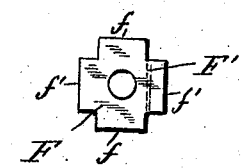
Witnesses:
Franck L. Orrand.
E. C. McCashin.
Inventor:
John G. Wenninger
By Wm. J. Mingle
Attorney

UNITED STATES PATENT OFFICE.

JOHN G. WENNINGER, OF LANCASTER, PENNSYLVANIA.

NUT-LOCK.

No. 848,080.     Specification of Letters Patent.     Patented March 26, 1907.

Application filed October 5, 1906. Serial No. 337,582.

*To all whom it may concern:*

Be it known that I, JOHN G. WENNINGER, a citizen of the United States, residing at Lancaster, in the county of Lancaster and State of Pennsylvania, have invented certain new and useful Improvements in Nut-Locks, of which the following is a specification.

My invention relates to improvements in nut-locks; and the object of the invention is to provide a practical, simple, and durable locking device for the nuts on fish-plate bolts of railroad-joints, said device being adapted to lock the nut on the bolt and prevent it from turning in consequence of the vibrations of the rail-joints from passing trains, and thus allowing the bolts to work loose or out entirely, if not constantly watched and frequently adjusted.

A further object of this invention is to so construct the locking device as to subject it to the least tensile strain from the expansion of the rails.

I attain these objects by the mechanism illustrated in the accompanying drawings, similar letters referring to similar parts throughout the several views.

Figure 1 is a side elevation showing the application of my locking device to the bolt-nuts of rail-joint fish-plates; Fig. 2, the same view as Fig. 1, showing the fish-plate bolted to the rails before my nut-locking device is applied; Fig. 3, the main locking-bar for the end nuts; Fig. 4, the locking-washer for the center nut; Fig. 5, a sectional end elevation through the dotted lines A A of Fig. 1.

The invention consists in certain details of construction, which will be hereinafter more fully described, and pointed out in the claims.

Referring to the details of the drawings, B represents a railway-rail; C, the fish-plates; E, the nuts on the bolts clamping the fish-plates C fast to the rail B; D, my main locking-bar adapted to keep the nuts from turning; F, my metallic sheet-washer adapted to keep the center bolt-nut E' from turning; D', lugs integral with the main locking-bar D, adapted to keep the sheet-washer F from turning. In Fig. 2 one end of a rail B is illustrated with a section of fish-plate bolted fast to it by the end nuts E E. These nuts when drawn up tight are left so their sides stand perpendicular, as shown. An opening *c* through the rail and fish-plates is provided for the third or central bolt with its nut E'. Fig. 2 is now in condition to have the nuts E locked to prevent them from turning off their bolts, and the locking-bar D, Fig. 3, is provided for that purpose. The laterally-extending lugs *d* are adapted to bear on the top sides of the nuts E and the vertical ends of bar D *d' d'* against the inner sides of the same.

A central opening *c* through the locking-bar D registers with the opening *c* in the fish-plate and rail, so the central bolt may pass through them all. Lugs D' D' extend upwardly from the face of this locking-bar D wide enough apart to freely allow the thin metallic washer F, Fig. 4, to rest between them, as illustrated by the dotted lines in Fig. 3. Its top and bottom faces *f f*, bearing against these lugs D' D' effectually prevent this metallic washer from turning, and the laterally-extending lugs *f' f'* of this metallic washer F are provided, so that when the nut E' on the central bolt is screwed down on the washer F and locking-bar D, as shown in Figs. 1 and 5, one of the thin lugs *f'* may be bent and turned up against one of the vertical sides of nut E' on the central bolt, (shown at F', Fig. 1,) and thus keep the central nut from turning off its bolt from the vibrations caused by trains passing over the rail-joints. When necessary to remove the aforesaid central nut in order to take the joint apart, this upwardly-projecting lug F' of the thin metallic washer F is bent down, thus allowing the removal of the nut E' from its bolt. If this bending-down process of the lug *f'* should fracture the metal of the thin washer where formerly bent up, rendering that side lug unfit for bending up against the nut E' the second time, we still have the lug *f'* on the opposite side to the one formerly used in good condition and ready to be bent up against the central nut and effectually prevent it from turning. It will be observed that my nut-locking device is only long enough to be applied to the bolt-nuts on one end of the rail. This is done to prevent the strain on the bolts and nuts that would occur from expansion if the locking-bar embraced the several series of bolt-nuts on both ends of the rails.

Having thus described the details of construction, the application is simple and as follows: The fish-plates are bolted on the rails by the bolts and nut, as shown in Fig. 2. The locking-bar D is now placed in position as shown in Fig. 1, effectually preventing the nuts E from turning. The central bolt is now passed through the opening *c*, the thin metallic washer F placed on this bolt, resting down on and between the lugs D' of the locking bar D, the nut E' screwed down on the central bolt, as in Fig. 1, clamping the thin washer and locking-bar D down firmly on the fish-plate C. One of the side lugs of the thin washer F f' is now bent up against one of the sides of nut E' on the central bolt, thus preventing it from turning.

I do not confine myself strictly to the particular form of thin metallic washer shown. It might be square or the side lugs pointed, and instead of the lugs D' to prevent the washer F from turning the lugs f might be bent down at right angles to embrace the top and bottom edges of the locking-bar D and yet involve no further invention than I here employ to produce the device herein illustrated.

Having thus described my invention, what I claim as new, and desire to secure by Letters Patent, is—

1. The combination with the bolts and nuts clamping several parts of a mechanism together, of a locking-bar adapted to fit lengthwise between the vertical flat sides of said nuts adjacent to each other, and laterally-extending lugs integral with said locking-bar adapted to rest on the upper flat sides of said nuts, to assist in preventing them from turning, and a third bolt and nut adapted to clamp said locking-bar and the mechanism through which the former bolts are passed together, and a metallic washer F adapted to rest on said locking-bar between it and the lower face of said third bolt-nut, and lugs D' integral with said locking-bar adapted to prevent said washer from turning, and laterally-extending lugs f' f' integral with said metallic washer adapted to prevent said third bolt-nut from turning, substantially as described.

2. In a nut-locking device the combination with the bolts and nuts of a locking-bar adapted to rest on the upper and against the inner faces adjacent to each other of said nuts and a third bolt adapted to clamp the work and said locking-bar together and a metallic washer adapted to rest on said locking-bar between it and the lower face of the nut on the said third bolt and means provided to keep said washer from turning on the face of said nut-locking bar, and means integral with said washer adapted to rest against the side of said third bolt-nut to prevent it from turning.

In testimony whereof I affix my signature in presence of two witnesses.

JOHN G. WENNINGER.

Witnesses:
 ADAM DELLET,
 W. J. MINGLE.